US009218740B2

(12) United States Patent
Bahl et al.

(10) Patent No.: US 9,218,740 B2
(45) Date of Patent: Dec. 22, 2015

(54) ENRICHING DRIVING EXPERIENCE WITH CLOUD ASSISTANCE

(71) Applicant: Microsoft Technology Licensing, LLC, Redmond, WA (US)

(72) Inventors: Paramvir Bahl, Bellevue, WA (US); Srikanth Kandula, Redmond, WA (US); Anand Padmanabha Iyer, Berkeley, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/724,391

(22) Filed: May 28, 2015

(65) Prior Publication Data

US 2015/0262486 A1 Sep. 17, 2015

Related U.S. Application Data

(62) Division of application No. 13/830,732, filed on Mar. 14, 2013, now Pat. No. 9,092,984.

(51) Int. Cl.
*G01G 1/16* (2006.01)
*G08G 1/16* (2006.01)

(52) U.S. Cl.
CPC .................................... *G08G 1/161* (2013.01)

(58) Field of Classification Search
CPC ..................................................... G08G 1/161
See application file for complete search history.

(56) References Cited

U.S. PATENT DOCUMENTS

2012/0091261 A1* 4/2012 Lee ................................ 244/33

* cited by examiner

*Primary Examiner* — Mary Cheung
*Assistant Examiner* — Yuen Wong
(74) *Attorney, Agent, or Firm* — Alin Corie; Sandy Swain; Micky Minhas

(57) ABSTRACT

Described is a technology by which driver safety technology such as collision detection is implemented via mobile device (e.g., smartphone) sensors and a cloud service that processes data received from vehicles associated with the devices. Trajectory-related data is received at the cloud service and used to predict collisions between vehicles and/or lane departures of vehicles. To operate the service in real-time with low latency, also described is dividing driving areas into grids, e.g., based upon traffic density, having parallel grid servers each responsible for only vehicles in or approaching its own grid, and other parallel/distributed mechanisms of the cloud service.

17 Claims, 7 Drawing Sheets

ENRICHING DRIVING EXPERIENCE WITH CLOUD ASSISTANCE

BACKGROUND

Technology to improve the safety of driving has evolved to now include assistive technology based upon sensors built into vehicles, e.g., automobiles. Features such as lane departure warning, collision detection and blind-spot monitoring are available, based upon camera, laser and radar technology or a combination thereof.

Today such assistive technologies are not affordable and/or not widely available. For one reason, at price points typically on the order of several thousands of dollars, these technologies are typically only purchased in high-end cars. Further, car manufacturers need to build embedded systems that remain reliable for as long as the lifetime of the car. Upgrading the software or hardware of such features is rarely easy and often not practically possible.

As an alternative to such stand-alone solutions in which each vehicle fends for itself, in late 1999, the United States Federal Communications Commission (FCC) allocated 75 MHz of spectrum in the 5.9 GHz band for the so-called Dedicated Short-Range Communications (DSRC) to be used by Intelligent Transportation Systems (ITS). The general idea was to implement safety improvements based upon inter-vehicle (v2v) or vehicle-to-infrastructure (v2i) communications, with vehicle and roadside monitors providing warnings to drivers. However, when researched, deploying dedicated roadside infrastructure has turned out to be very expensive, whereby actual implementation of this technology is unlikely to become widely available. Car manufacturers also have not adopted this technology to any noticeable extent, and any standardization across car manufacturers likely will be slow.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a service (e.g., a cloud service) receives a wireless communication that is sent from a mobile device associated with a vehicle, in which the wireless communication comprises information corresponding to a trajectory of the vehicle. The service determines from the trajectory-related information whether the vehicle is at risk of a collision, and if so, sends alert-related data to the vehicle. The risk of the collision may be whether the vehicle is within a threshold distance of another vehicle based upon the trajectory-related information and the other vehicle's trajectory, and/or whether the vehicle is in a lane departure state, e.g., based upon the trajectory-related information and road-related data.

In one aspect, a cloud service is configured with servers, including a plurality of grid servers. Each grid server is associated with a grid of plurality of grids, in which each grid corresponds to a geographic area. Each grid server computes whether vehicles that are known to the server to be in or approaching its associated grid are at risk of collision. If so, the grid server outputs alert-related data for communication to at least one of the vehicles that is at risk of collision.

In one aspect, trajectory-related data is received from a vehicle mobile device. The trajectory-related data is used to determine at least one grid corresponding to the vehicle mobile device. A query based upon the trajectory-related data of the vehicle is made as to whether the vehicle is at risk of a collision within the grid, and if so, alert-related data is output.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using a smartphone (or similarly widely available communications device suitable for vehicles) along with a cloud computing service (or services) to assist drivers, especially with respect to improving driver safety. In one aspect, the cloud-based assistive technology may warn drivers upon lane departures, impending collisions, and/or vehicles in blind-spots.

It should be understood that any of the examples herein are non-limiting. For one, while a mobile device is used as an example of a suitable device for implementing the technology described herein, a more stationary (e.g., built-in or partially built-in) automotive device may be used; the device is mobile with the vehicle. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computer-related driving experiences including assistance, alerts and notifications in general.

Figure 1:
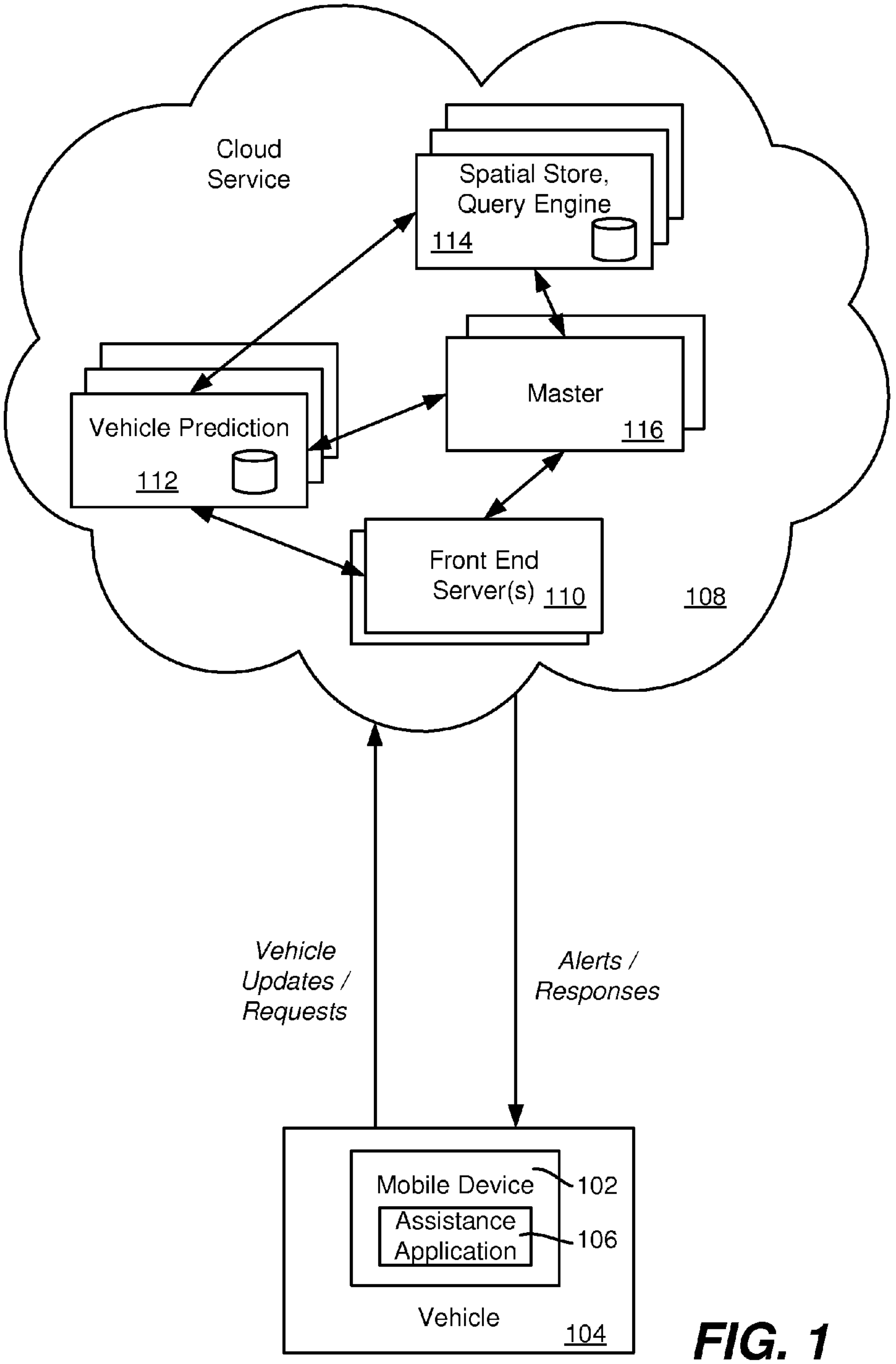
FIG. 1 is a representation of an architecture comprising a cloud service and mobile devices of vehicles, in which the cloud service is configured to assist drivers of the vehicles, according to one example embodiment

FIG. 1 is an example block diagram showing components of one example architecture comprising a mobile device 102

(e.g., in a moving vehicle 104) running an assistance application 106, coupled to a cloud service 108, e.g., a backend geo-fencing-based cloud service. Although not explicitly shown in FIG. 1, it is understood that there are typically many such applications running in many vehicles, moving in many locations, each coupled to the cloud service.

Figure 2:
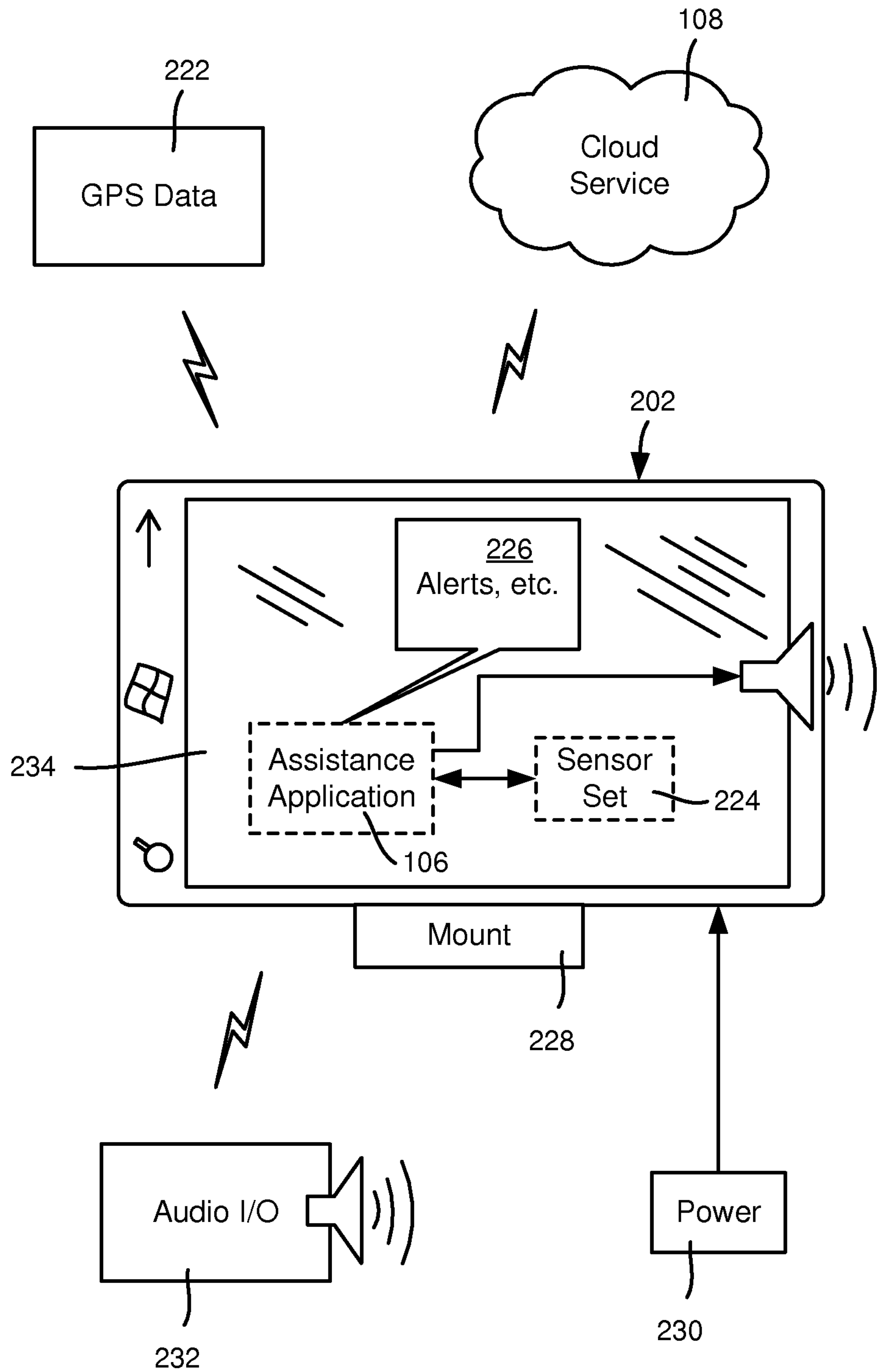
FIG. 2 is a block diagram of example components and data used by a mobile device in obtaining trajectory related data and taking action upon alerts, according to one example embodiment.

The mobile device 102 may be implemented in a smartphone 202, as generally represented in FIG. 2. Instead of a smartphone, it is understood that another device may be used (that is a mobile device 102 in that it at least moves with the vehicle 104). For example the application or similar logic/code may run on a dedicated GPS device coupled to or having internet connectivity, or on a device built into the vehicle; (e.g., a typical built-in vehicle navigation or entertainment system), and so forth.

As described herein, the assistance application 106 periodically (or otherwise) collects information from GPS data 222 via a sensor set 224 comprising a GPS device and other sensors on the mobile device 102/(exemplified as the smartphone 202), and sends them to the service 108. By combining this information across mobile devices (that is, vehicles), and along with other relevant information, the cloud service 108 is able to raise targeted alerts 226 and responds to queries from the mobile device 102.

A display 234 of the mobile device 102 (e.g., smartphone 202) is one possible way to raise an alert, and also to receive touch input from a user; other input and output mechanisms may be used. For example, user input may comprise any input data received, including via a Natural User Interface (NUI), where NUI generally refers to any interface technology that enables a user to interact with a device in a "natural" manner, such as free from artificial constraints imposed by input devices such as mice, keyboards, remote controls, and the like. Examples of NUI include those based upon speech recognition, touch and stylus recognition, gesture recognition both on screen and adjacent to the screen, air gestures, head and eye tracking, voice and speech, vision, touch, gestures including motion gestures, and machine intelligence. Motion gesture detection may use accelerometers/gyroscopes, facial recognition, 3D displays, head, eye, and gaze tracking, immersive augmented reality and virtual reality systems, which provide a more natural interface, as well as technologies for sensing brain activity using electric field sensing electrodes (EEG and related methods).

Note that FIG. 2 is an example block diagram representing the smartphone 202 coupled to a vehicle dashboard via a suitable mount 228. The mount 228 may include an interface such that when mounted, the device 102 receives power 230, and may be coupled to other input and/or output mechanisms. As is understood, a separate interface such as a physical connector (e.g., to the device's USB interface) may be used for power and/or other input/output; Bluetooth® or the like may be used for input/output. As also represented in FIG. 2 via block 232, speech may be used to provide input, and audio (e.g., audible tones, spoken alerts and/or responses) may be output, and so forth. The display may be a heads-up display in another implementation.

The sensor set 224 may include a GPS device, accelerometer, and gyroscope. Other sensors, including those often in a smartphone may be present, e.g., a magnetometer 340. Still other sensors may include, but are not limited to an altimeter, inclinometer, potentiometer and so forth. Cameras, depth cameras and the like also may capture useful information; for example, the service may be notified of another nearby vehicle that is not actively participating by uploading information (e.g., the driver forgot or does not want the application on his or her smartphone) in the service. Further, if the information is available to the mobile device upload, car sensor data may be used, e.g., proximity sensors built into the car may be coupled to the mobile device, and such sensor data uploaded to the cloud service 108 for use as deemed appropriate.

In one implementation, each installation of the assistance application 106 has a unique identifier (ID), at least unique relative to other assistance application installations. The service 108 uses this ID to identify the vehicle in which the smartphone or other device is running the application. A front end server of a set of front end servers 110 hashes this ID and forward the vehicle updates and requests from that smartphone to a server in the vehicle prediction layer 112 that is responsible for this ID.

More particularly, in one implementation of the cloud service 108, as shown in FIG. 1, mechanisms include the vehicle prediction layer 112 (implemented in a set of servers), and a spatial store and query engine layer 114 (implemented in a set of servers). As can be readily appreciated, these mechanisms may be divided into more than one component, e.g., the spatial store and query engine are generally separate communicating components, however for reasons described below, instances of such components may run on the same server. As is generally shown in FIG. 1, there may be multiple instances of these mechanisms, e.g., on various servers and the like, including instances operating in and/or covering different locations. Moreover, as used herein, any one "server" may comprise any number of physical and/or virtual machines, e.g., an actual single machine or a plurality of machines that work together to act as a single server in some way.

The query engine in one implementation, which queries for information such as whether the vehicle is predicted to possibly intersect with another vehicle's trajectory at a given time, as described below) may execute on the same servers that comprise the spatial store. The query engine in general executes queries that raise safety-related alerts periodically (or otherwise), e.g., once every 100 ms.

Also shown in FIG. 1 is a master server 116 (which may comprise a plurality of connected servers) that in general orchestrates the overall architecture operations. For example, the master server 116 monitors the load and failure status of servers in the vehicle prediction layer 112 and the spatial store layer 114. In response to overload or server failure, the master server 116 can bring new servers online, can change the hash function that maps phone IDs to servers in the vehicle prediction layer 112, and can adapt the mapping of grids to servers in the spatial store layer 114.

In one implementation, the master server 116 role that maintains the architecture is performed by a relatively small number of servers, in a Paxos ring, that adapt the service 108 architecture to failures and load. The master server 116 (actually servers in this example) controls the mapping from grids to servers via a label lookup tree (described below) that the master server 116 pushes to other servers. The master server 116 also determines how vehicle IDs are mapped to servers at the prediction layer 112 through a hash function that maps vehicles to buckets, which rarely changes, and a function that assigns buckets to servers. The other servers exchange heartbeats with the master server 116 once every 100 ms. Three consecutive missed heartbeats are treated as a sign of server failure. When a server in the spatial store (or the prediction layer) fails, the master assigns its grids (or buckets) to other servers by pushing an updated label lookup tree (or bucket to server map). Content in the spatial store is not replicated since a new update will arrive within 100 ms from the phone app.

The vehicle prediction layer 112 has state collected over a longer duration for the vehicles. Each bucket is thus also assigned a backup server, and vehicle state is checkpointed once every ten seconds to the backup server. Data since the last checkpoint is retrieved from the assistance application. The expected period of unavailability upon single server failure is about 500 ms, which is acceptable for an assistive technology. Note that overload is more common, and the service 108 handles it without downtime by treating overload as a non-fatal failure; the lookup tree (or bucket to server map) is changed, as in the case of a failure, but the identity of the previously responsible server is retained for a short while after the change to facilitate access to past data.

Servers in the vehicle prediction layer 112 predict the future state of the vehicle between the time received and when the next update from this vehicle is expected. The predicted trajectory of the vehicle is stored as a function of time. For example, based on the updates from the mobile device 102, the vehicle prediction layer 112 may compute a predicted trajectory for the vehicle as:

$$\text{location}(t) = \begin{bmatrix} x \\ y \end{bmatrix} + \left(st + \frac{at^2}{2}\right)\begin{bmatrix} \sin\theta + \gamma t \\ \cos\theta + \gamma t \end{bmatrix} \quad (1)$$

where x, y is the reported location of the vehicle, s is its speed, a is the acceleration, θ is the course and γ is the yaw, i.e., lateral change in course. Note that x corresponds to latitude, y to longitude, the course values count clockwise from due North and the yaw of the vehicle indicates the rate of change in its course. Further, note that the mobile device may make the computation (or a part thereof) and upload the result to the prediction layer 112.

The assistance application 106 obtains the data from the sensor set 224, including location, speed and course from the mobile device's sensor GPS reading, acceleration from the device's accelerometer and yaw from the gyroscope. The location, speed and course of the mobile device 102 are the same as that of the vehicle 104. However, if the device is also mobile relative to the vehicle, such as a smartphone that is not mounted, the accelerometer and gyroscope readings have the device (e.g., smartphone 202) as their frame of reference and need to be transformed. For example, if the driver holds a phone with the screen facing him or her, and points with the hand holding the phone towards where the vehicle is heading, then the along-road acceleration of the vehicle corresponds to the accelerometer reading along the phone's z axis. The assistance application 106 uses calibration to do this correction; in theory, such a calibration can be difficult, because whenever the phone moves relative to the vehicle the calibration has to be redone. In practice, without being given any specific direction, drivers (in at least one dataset) tended to keep the phone steady, e.g., in a cup holder, sunglass holder or pocket for instance for a significant majority of the observed driving time, and thus calibration is reasonable to perform.

The assistance application 106 may compensate for errors in location, speed, and course by map matching, using known road segment information to place the car in real time on the most likely roadway based on current and previous readings. The assistance application 106 may use prior trip data from the same user when available, and expected traffic patterns otherwise to predict whether the user is likely to continue along the same roadway or which way he or she would turn. Note that curvy roads can be handled by Equation (1) with an appropriate amount of yaw; however piece-wise function to model turns may be used instead of (or in combination with) yaw.

As described above, the vehicle prediction layer 112 computes (or is provided with the computation result) and stores the predicted trajectory as a function of time. In one implementation, the geographic region being monitored is divided into variable sized grids and each grid is assigned to one of the servers in the spatial store 114. Upon computing or receiving the predicted trajectory of a vehicle, servers in the vehicle prediction layer 112 forward the information to any possible grids (represented by servers) that the vehicle 104 will pass through, based on the prediction, before its next update. As a result, the server corresponding to a grid is aware of the vehicles that are currently in the grid or may be in the grid soon, that is, before the next expected update from the vehicle. This information is kept in an in-memory data structure.

Note that a grid server knows the vehicles in its grid or that may enter its grid, and this information may be used to reduce computations and communication resources. For example, in a normal-to-heavy traffic situation, a vehicle's mobile device may be uploading its location information every 100 ms; in lighter traffic situations, the vehicle's mobile device may be instructed to upload less frequently, e.g., every 200 ms. This frequency may change as needed; however when reduced, the reduction in needed resources may allow for resource reallocation to heavier traffic locations.

As described herein, in one implementation the service 108 uses spatial partitioning to divide work across servers. By keeping nearby data in-memory on the same server, the service 108 keeps queries local to a server, thereby achieving low latency, while allowing many queries to run in parallel thereby achieving high throughput. Note that vehicular density is typically highly skewed, e.g., most of the space has only a low density, while regions that overlap arterial roads or intersections have much greater density. The load in a region can also change during rush hours, construction and accidents.

The grids need not be square, rectangular, (e.g., hexagonal is feasible), or even symmetric or tessellated, but in general correspond to the areas (including road areas) covered by the cloud service 108. Thus, as used herein, a "grid" refers to any coverage area. In one implementation, the service 108 (e.g., the master server 116) divides space into square grids that have approximately even load. To this end, the service 108 recursively subdivides grids that have too much load and collapses grids with too little load. To do this efficiently, the service identifies geographic regions of varying sizes and quickly determines which server is responsible for any location. To this end, the service 108 in one embodiment uses the standard military grid reference system (MGRS). In this scheme, a value such as 15T TF 58435 76808 represents a particular 1 m×1 m location on the earth; the numeric suffix contains two equal sized parts known as the easting and the northing (five numerals each in the value). An alphanumeric prefix15T TF uniquely identifies a 100 Km×100 Km region on the surface of earth. Recursively, this region may be divided into 10×10 smaller regions and a pair of numerals identify the east, north location of a particular smaller region. That is, in the above example, 15TTF57, 15TTF5876, 15TTF584768, represent the 10 Km×10 Km, 1 Km×1 Km and 100 m×100 m regions containing the above point. MGRS lets the service 108 uniquely identify varying sized regions in a hierarchical manner.

Figure 3A:
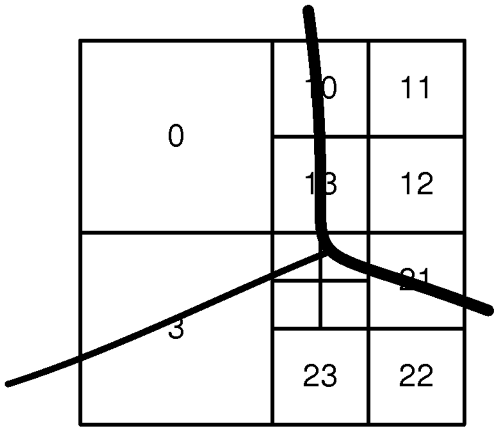
FIG. 3A is a representation of how grids may be recursively sized based upon traffic density, according to one example embodiment.
Figure 3B:
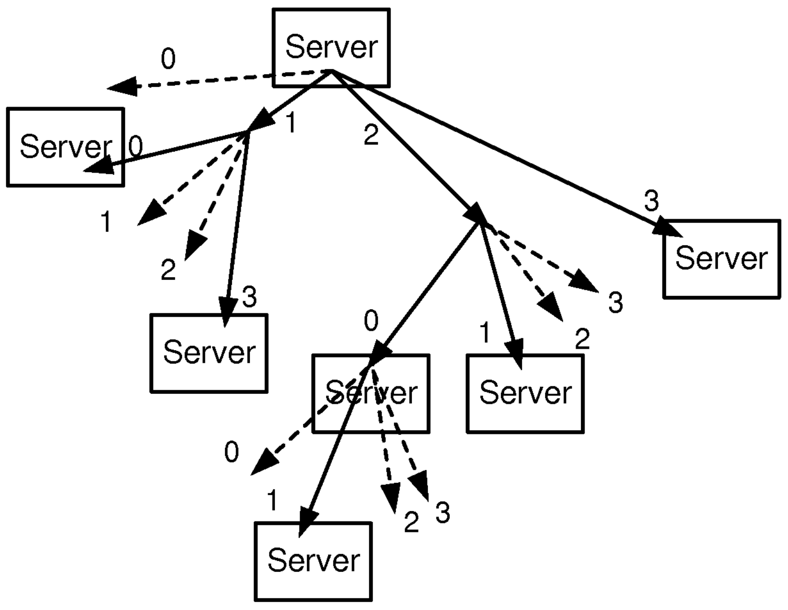
FIG. 3B is a representation of how servers may be associated with grids, according to one example embodiment.

To determine which server is responsible for a location, the service 108 uses the longest prefix match on the MGRS label of that location. An illustrative example is shown in FIGS. 3A and 3B. FIG. 3A shows an example of recursively partitioning space into grids. At each level, the space is divided into four equal quadrants and labeled 0-3 from top left and counting clockwise.

The solid lines in FIG. 3A represent a region with two roads; the thickness of the roads corresponds to average vehicle density. FIG. 3A also shows how the service 108 might partition this space. The higher density of the thicker north-to-east road forced a 1/16th split of the space whereas the thinner road entering on the western border can be handled with only a 1/4th split; the busy interchange uses a 1/64th split.

FIG. 3B shows a tree representation of how the service 108 maps locations to servers using longest prefix match. Each node in the tree has a server associated with it. There are four servers corresponding to each of the 1/16th sized grids that the thick road goes through, and one each for the thin road and busy intersection. Grids that have not been expanded are illustrated with dashed-line edges. To lookup a label, the process starts at the root and follows along the edges with characters in the label until it can go no further, thereby finding the server that is responsible for the smallest grid that contains this location.

Note that the time complexity of performing a longest prefix match is O(length of the label), which is logarithmic in the area but constant for all practical purposes (fifteen in the case of MGRS). Also, rather than run per-vehicle queries which become complex when the vehicle is near a boundary, the service 108 runs per-grid queries. The prediction layer 112 forwards vehicular information to each of the grids that the vehicle may pass through. The service 108 need not use the finest granularity, e.g., the service may use 10 m×10 m as the finest granularity grid in one implementation, e.g., because the application 106 sends updates every 100 ms, vehicles traveling slower than 100 m/s or 223 mph rarely pass through more than two grids between updates. Finally, the longest prefix match allows a server to be responsible for any of the smaller regions within its region that are not dense enough to require their own server. This leads to a more compact division of work. In the above example, the service 108 has to assign servers for only seven grids; many of the sparse regions (e.g., labeled 0, 11, 12, 22 and 23 in FIG. 3A) are handled by the root node.

Turning to supporting queries on continuous data, the service 108 executes queries per-grid that perform continuous math on the predicted location of vehicles. For example, checking for collisions in a grid translates to:

$$\exists \text{ vehicles } v1, v2, \text{time } t^*, \text{ such that } L_{v_1}(t^*) - L_{v_2}(t^*) < \epsilon. \qquad (2)$$

where $L_v$ is the location function from equation (1), $\epsilon$ is some small distance value and the minus operation computes the Euclidean distance between the two locations. With this equation, the service 108 checks whether two vehicles in the grid come very close to each other at some time.

The corresponding check for whether the vehicle is in a state of lane (including lane or roadside) departure is:

$$\exists \text{ vehicle } v, \text{ time } t^*, \text{ such that } \min(L_v(t^*) - \text{left edge} > d, \Lambda\min(L_v(t^*) - \text{right edge} > d \qquad (3)$$

where the edges of the lane/road are represented as curves and d is the maximum amount of acceptable drift over the edge. This equation checks that the shortest distance between the vehicle and both the edges of the lane/road are above d which would only happen when the vehicle has drifted off one of the edges.

The service 108 solves these inequalities as follows. Equation (2) wants the Euclidean distance between two vehicle locations to be smaller than $\epsilon$. This only happens if both $|x_{v_1} - x_{v_2}|$ and $|y_{v_1} - y_{v_2}|$ are smaller than $\epsilon$; here $x_v$, $y_v$ represent the x and y coordinates of location $L_v$. Notice from Equation (1) that, if the yaw ($\gamma$) is small, then both the x and y components of the location are second degree polynomials over the time variable t. Hence the difference between two values of x (or y) has the same degree and checking that its value is small can be done by quadratic factorization.

Equation (3) can also be solved in a similar manner. When the yaw is large, the Taylor approximation for cos and sin may be used, which increases the degree of the polynomial but is still solvable. In this way, the service 108 can check whether the differences in distance are small at any time before the next update from these vehicles (100 ms) with only a few numeric operations.

As can be seen, there is described a service that handles high throughput for both updates and queries, e.g., up to $O(10^5)$ cars per metropolitan area, updates per car once every 100 ms and a similar frequency of alerts. This corresponds to a need for a cumulative update and query throughput of up to $O(10^6)$ per second. To this end, the service leverages the fact that the coupling between data items is sparse and structured; to assist a driver, the service 108 only needs to process updates from nearby vehicles.

For high throughput, the service 108 parallelizes its components; the vehicle prediction layer is indexed by application ID whereas the spatial store is indexed by grids. To be useful for driver safety, the system responds at driver timescales, e.g., about 100 ms. The cloud service's latency is attempted to be limited to 50 ms. For low latency, the service spatial store keeps records in memory.

Instead of executing queries per vehicle, the service 108's query engine executes queries per grid, e.g., whether any vehicles will collide in this grid in the next 100 ms. Because there are many fewer grids compared to the number of vehicles and collisions or other alerting events are rare, per-grid querying is fast; there are fewer queries to execute and no duplication of work as with per-vehicle querying. Further, whereas queries for items near a vehicle can require data items that reside just across the boundary in another grid, changing the scope of queries to be per-grid allows the service 108 to not worry about such items. Hence, the service 108's queries are truly parallel, and the data needed to execute a per-grid query lies within the server responsible for that grid. Queries that touch only one server do not encounter potential contention on the network or at other servers and can finish faster.

With respect to continuous change in the data items and also of the set of other items with which an item is coupled, for any vehicle, the cloud service 108 knows its state (location, speed and, course) at some time in the recent past when the application generated an update. To be relevant, an alert is based on the current and future locations of this vehicle and that of other vehicles that are or will be in its vicinity. The service 108 has a vehicle prediction layer that uses the sensor readings from the vehicle (e.g., speed, course, acceleration, rotation) and supporting information such as the user's route history, estimates of traffic on road segment and roadway information to predict the trajectory of the vehicle.

It is also desirable to provide driving alerts regardless of server failures and load hotspots on roads due to congestion, accidents, construction or busy intersections. The service's master server (e.g., clustered servers for reliability) may be responsible for monitoring and adapting the architecture in response to load changes and faults. For example, the service's spatial structure allows a grid to be divided when there are too many vehicles in that grid without having to move a lot of data or having to create a lot of unnecessary grids.

Further, the service is able to support queries on arbitrary, much larger location ranges (e.g., accidents, disabled vehicles or congestion further ahead). The service 108's spatial store serves as a filter to other data stores that are geared towards lower update and query rates, but can persist data and serve arbitrary queries. Not only may alerts be provided to mobile devices of vehicles upon request or by pushing to the vehicles, but other users of the service (e.g., a traffic control system, a state or local agency, a user at a desktop computer) may query the service for useful information. Thus, the service facilitates using its collected vehicular data to improve knowledge of the world (e.g., use routes traveled and the speed at which the routes are traveled to generate better maps and traffic information), to facilitate traffic planning (e.g., give different routes to different vehicles so as to balance the traffic), and geo-fencing, such as to raise alerts when the user is at home/work/within some distance from some location (e.g., a coffee shop).

Figure 4:
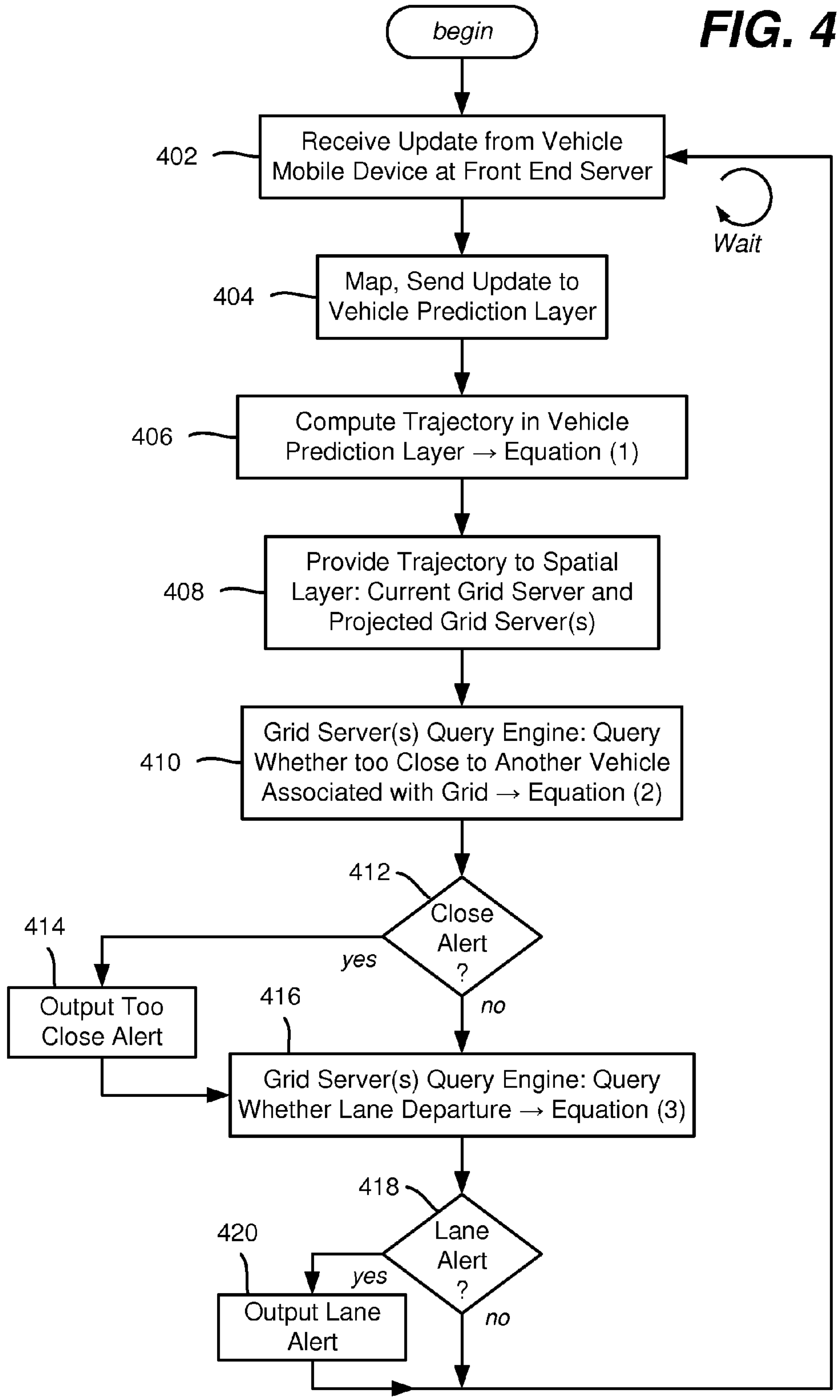
FIG. 4 is a flow diagram representing example steps that may be taken to determine whether a vehicle is at risk of a collision, so as to issue one or more alerts, according to one example embodiment.

FIG. 4 is an example flow diagram directed towards processing an update, e.g., via the architecture of FIG. 1. Step 402 represents receiving an update from a sending mobile device at a front end server. Step 404 represents mapping the unique service ID of the sender of the update to a server in the vehicle predication layer, using the hash function from the master server.

At step 406, the vehicle prediction layer computes the trajectory using equation (1) in this example. As described above, it is also feasible for the device to perform some or all of the computation. With the computed location information, the vehicle prediction layer knows which grid the vehicle is currently in, and which grid or grids (if any) the vehicle is projected as possibly to be in by the next update, and provides this information to the appropriate "grid" server(s) at the spatial layer (step 408).

Step 410 represents the one or more grid servers, via their query engine(s), each performing a query as to whether the vehicle is too close to another vehicle based upon the information maintained for that grid and Equation (2). If so, a "too close" alert is issued via steps 412 and 414, e.g., to each of the vehicles involved; as described above, this may be an audible alert (speech and/or a warning tone or set of tones), a visible alert (flashing screen), or possibly a tactile alert, such as via a vibrating steering wheel. Otherwise no alert need be issued. As can be readily appreciated, this aspect comprises "geo-fencing" by informing the driver whenever this or another vehicle enters a specified geographic region. The number of vehicles to inform/alert may be dependent on velocity, distance, location estimation error, round-trip latency to the cloud and server computing delay.

Step 416 similarly represents the query engine(s) each performing a query as to whether the vehicle has departed its lane, based upon Equation (3). If so, a "lane departure" alert is issued via steps 418 and 420, e.g., to the current vehicle whose update is being processed. The lane departure alert, if output, may be different from the too close alert (e.g., different tones or patterns), or they may be the same, directed towards having the driver pay more attention.

If both alerts are different in some way and are both to be issued, the alerts may be batched into a single transmission, and configured to avoid interfering with one another. For example, each may have a different tone and/or tone pattern, with the tones alternating. Another possibility is that one alert (e.g., the "too close" alert) may supersede another (e.g., a "lane departure" alert), in which step only the superseding alert need be output and sent to the vehicle's mobile device. Any of the alerts may be user configurable, e.g., a driver with a hearing disability may configure the mobile device to output visible alerts, or alerts with certain frequencies that the driver is able to hear.

As can be seen, using a mobile device (such as a smartphone or a built in vehicle device), with only relatively inexpensive sensors and a wireless connection to a cloud service, can enrich the driving experience, including via assistance for safety enhancements. The technology may be implemented inexpensively, including via devices many people already own such as a smartphone, without needing new roadside infrastructure.

With straightforward communication of data from the mobile device/vehicle, the cloud service is able to handle a substantial number of vehicles, by partitioning work across servers for scale, yet responding in near real-time by ensuring that the processing needed to raise a warning is performed on just one server with high probability. The server may include algorithms that compensate for inaccuracies in sensed information by combining the sensed information with information from other sensors, other vehicles and/or historical information from the same vehicle.

EXAMPLE MOBILE DEVICE

Figure 5:
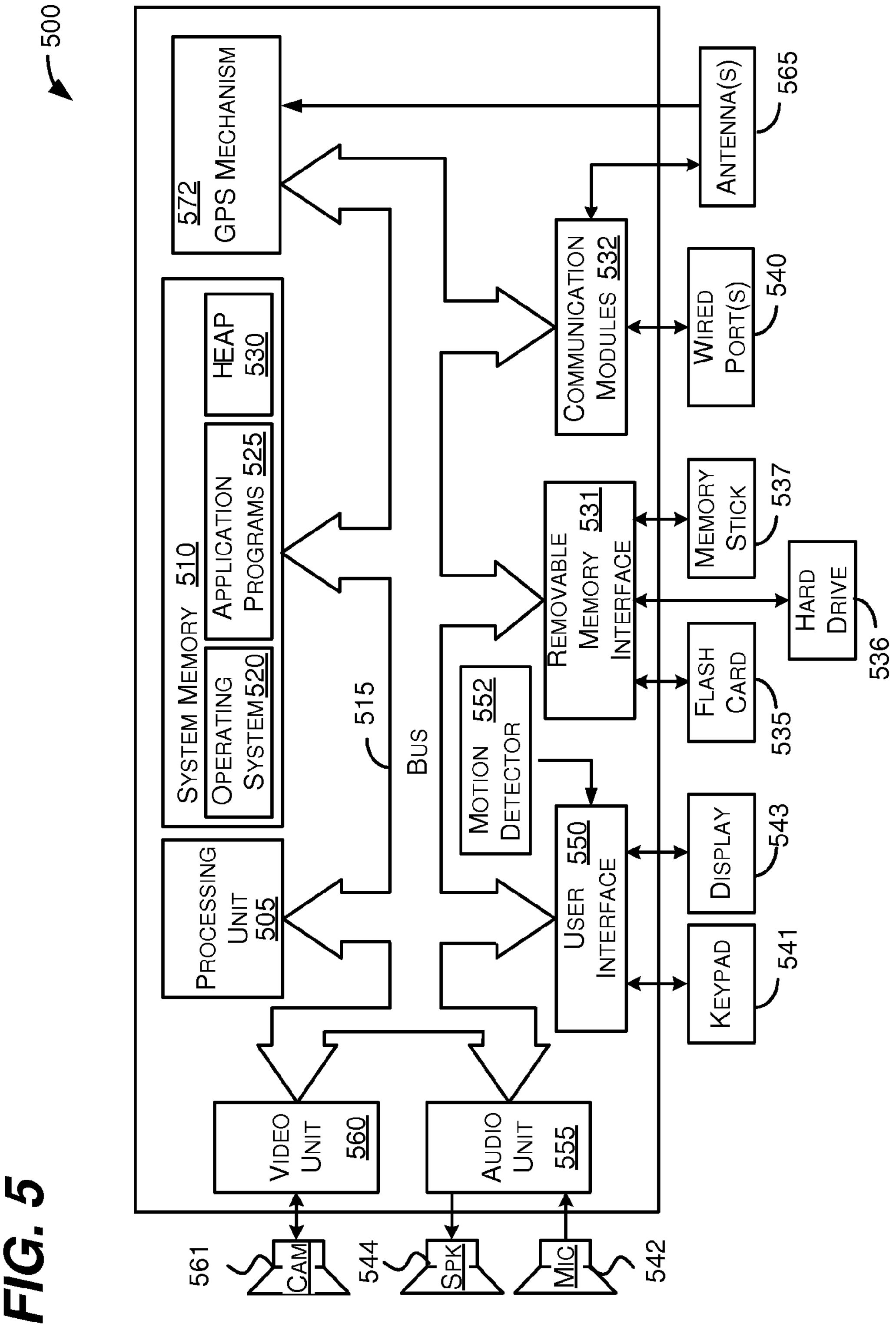
FIG. 5 is a block diagram representing an example computing environment, in the form of a mobile device, into which aspects of the subject matter described herein may be incorporated.

FIG. 5 illustrates an example of a suitable mobile device 500 on which aspects of the subject matter described herein may be implemented. The mobile device 500 is only one example of a device and is not intended to suggest any limitation as to the scope of use or functionality of aspects of the subject matter described herein. Neither should the mobile device 500 be interpreted as having any dependency or requirement relating to any one or combination of components illustrated in the example mobile device 500.

With reference to FIG. 5, an example device for implementing aspects of the subject matter described herein includes a mobile device 500. In some embodiments, the mobile device 500 comprises a cell phone, a handheld device that allows voice communications with others, some other voice communications device, or the like. In these embodiments, the mobile device 500 may be equipped with a camera for taking pictures, although this may not be required in other embodiments. In other embodiments, the mobile device 500 may comprise a personal digital assistant (PDA), hand-held gaming device, notebook computer, printer, appliance including a set-top, media center, or other appliance, other mobile devices, or the like. In yet other embodiments, the mobile device 500 may comprise devices that are generally considered non-mobile such as personal computers, servers, or the like.

Components of the mobile device 500 may include, but are not limited to, a processing unit 505, system memory 510, and a bus 515 that couples various system components including the system memory 510 to the processing unit 505. The bus 515 may include any of several types of bus structures including a memory bus, memory controller, a peripheral bus, and a local bus using any of a variety of bus architectures, and the like. The bus 515 allows data to be transmitted between various components of the mobile device 500.

The mobile device 500 may include a variety of computer-readable media. Computer-readable media can be any available media that can be accessed by the mobile device 500 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 500.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 510 includes computer storage media in the form of volatile and/or nonvolatile memory and may include read only memory (ROM) and random access memory (RAM). On a mobile device such as a cell phone, operating system code 520 is sometimes included in ROM although, in other embodiments, this is not required. Similarly, application programs 525 are often placed in RAM although again, in other embodiments, application programs may be placed in ROM or in other computer-readable memory. The heap 530 provides memory for state associated with the operating system 520 and the application programs 525. For example, the operating system 520 and application programs 525 may store variables and data structures in the heap 530 during their operations.

The mobile device 500 may also include other removable/non-removable, volatile/nonvolatile memory. By way of example, FIG. 5 illustrates a flash card 535, a hard disk drive 536, and a memory stick 537. The hard disk drive 536 may be miniaturized to fit in a memory slot, for example. The mobile device 500 may interface with these types of non-volatile removable memory via a removable memory interface 531, or may be connected via a universal serial bus (USB), IEEE 5394, one or more of the wired port(s) 540, or antenna(s) 565. In these embodiments, the removable memory devices 535-437 may interface with the mobile device via the communications module(s) 532. In some embodiments, not all of these types of memory may be included on a single mobile device. In other embodiments, one or more of these and other types of removable memory may be included on a single mobile device.

In some embodiments, the hard disk drive 536 may be connected in such a way as to be more permanently attached to the mobile device 500. For example, the hard disk drive 536 may be connected to an interface such as parallel advanced technology attachment (PATA), serial advanced technology attachment (SATA) or otherwise, which may be connected to the bus 515. In such embodiments, removing the hard drive may involve removing a cover of the mobile device 500 and removing screws or other fasteners that connect the hard drive 536 to support structures within the mobile device 500.

The removable memory devices 535-437 and their associated computer storage media, discussed above and illustrated in FIG. 5, provide storage of computer-readable instructions, program modules, data structures, and other data for the mobile device 500. For example, the removable memory device or devices 535-437 may store images taken by the mobile device 500, voice recordings, contact information, programs, data for the programs and so forth.

A user may enter commands and information into the mobile device 500 through input devices such as a key pad 541 and the microphone 542. In some embodiments, the display 543 may be touch-sensitive screen and may allow a user to enter commands and information thereon. The key pad 541 and display 543 may be connected to the processing unit 505 through a user input interface 550 that is coupled to the bus 515, but may also be connected by other interface and bus structures, such as the communications module(s) 532 and wired port(s) 540. Motion detection 552 can be used to determine gestures made with the device 500.

A user may communicate with other users via speaking into the microphone 542 and via text messages that are entered on the key pad 541 or a touch sensitive display 543, for example. The audio unit 555 may provide electrical signals to drive the speaker 544 as well as receive and digitize audio signals received from the microphone 542.

The mobile device 500 may include a video unit 560 that provides signals to drive a camera 561. The video unit 560 may also receive images obtained by the camera 561 and provide these images to the processing unit 505 and/or memory included on the mobile device 500. The images obtained by the camera 561 may comprise video, one or more images that do not form a video, or some combination thereof.

The communication module(s) 532 may provide signals to and receive signals from one or more antenna(s) 565. One of the antenna(s) 565 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 572. In turn, the GPS mechanism 572 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 500 may connect to one or more remote devices. The remote devices may include a personal computer, a server, a router, a network PC, a cell phone, a media playback device, a peer device or other common network node, and typically includes many or all of the elements described above relative to the mobile device 500.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

EXAMPLE NETWORKED AND DISTRIBUTED ENVIRONMENTS

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
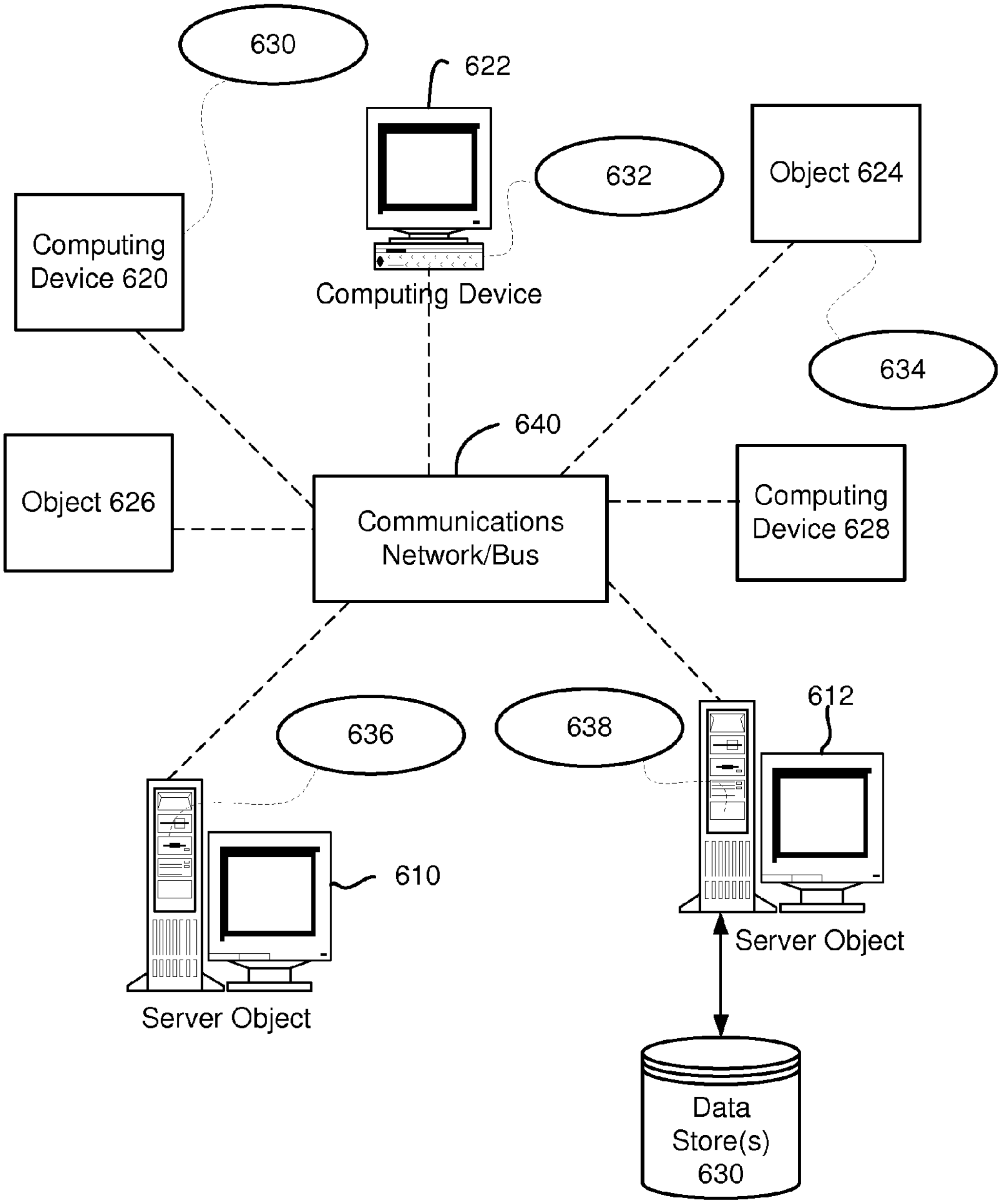
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

EXAMPLE COMPUTING DEVICE

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device, such as one of possibly many used in a cloud service.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
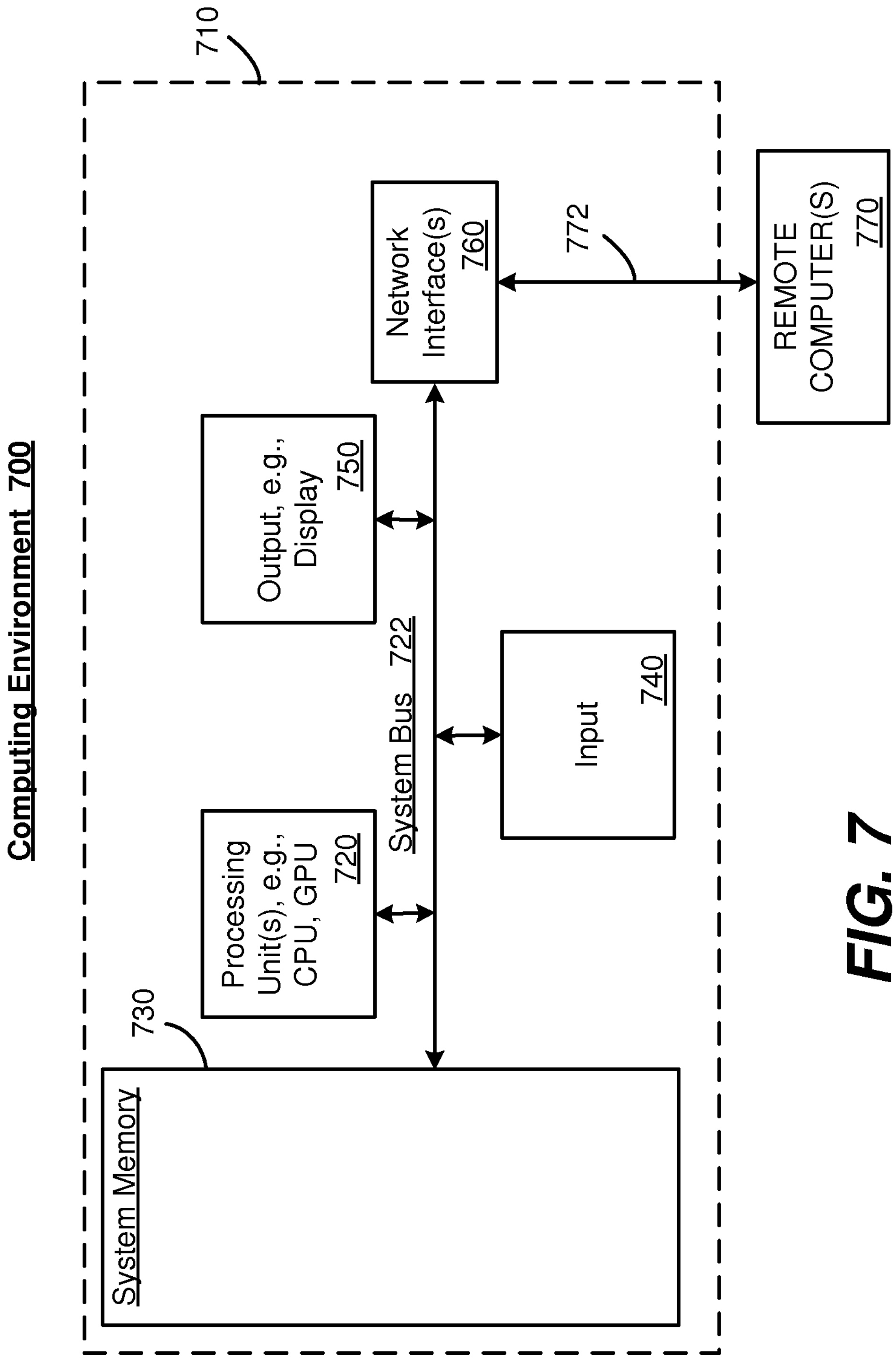
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A system in a grid computing environment, comprising:
a plurality of servers executing a cloud service, including:
a plurality of grid servers associated with a plurality of grids, an individual grid server associated with an individual grid corresponding to an area;
at least one server configured to receive sensed data from mobile devices associated with vehicles; and
the individual grid server configured to:
determine whether vehicles that are known to the associated individual grid server to be in or approaching the associated individual grid are at risk of collision among vehicles in the area based on information received at the cloud service from the mobile devices associated with the vehicles;
compensate for inaccuracies in the sensed data by combining the sensed data with at least one of information from one or more other sensors on the mobile devices, information from one or more other vehicles, or historical information associated with the vehicles or the mobile devices;
output alert-related data for communication to at least one of the vehicles that is at the risk of collision; and
issue an alert via at least one mobile device to at least one driver associated with the at least one of the vehicles that is at the risk of collision, the alert comprising at least one of an audible alert, a visible alert, or a tactile alert, wherein the at least one mobile device comprises at least one of a smartphone or a built-in vehicle device.

2. The system of claim 1, wherein the individual grid server is further configured to raise an alert to a recipient, including a recipient not in a vehicle, or a recipient in another vehicle based upon a distance of the other vehicle to a location.

3. The system of claim 1, wherein at least one grid server comprises a spatial store and a query engine that share information in a common memory.

4. The system of claim 1, further comprising:
a master server configured to determine grid coverage area for individual grids of the plurality of grids and associate the individual grid server with the individual grid.

5. The system of claim 1, wherein the individual grid server is further configured to:
output the alert-related data to a plurality of vehicles, in which the plurality of vehicles are determined based upon at least one of: velocity, distance, location estimation error, cloud service latency, or server computing delay.

6. A method in a computing environment comprising:
receiving, by at least one grid server of a plurality of grid servers, sensed data from mobile devices associated with vehicles, wherein the at least one grid server is associated with at least one grid corresponding to an area;
determining whether the vehicles that are known to the at least one grid server to be in or approaching the associated at least one grid are at risk of collision among other vehicles in the area based on information received from the mobile devices associated with the vehicles;
compensating for inaccuracies in the sensed data by combining the sensed data with at least one of information from one or more other sensors on the mobile devices, information from one or more other vehicles, or historical information associated with the vehicles or the mobile devices;
outputting alert-related data for communication to at least one of the vehicles that is at the risk of collision; and
issuing a warning via at least one mobile device to at least one driver associated with the at least one of the vehicles that is at the risk of collision, the warning issued via at least one of an audible alert, a visible alert, or a tactile alert, wherein the at least one mobile device comprises at least one of a smartphone or a built-in vehicle device.

7. The method of claim 6, further comprising:
raising an alert to a recipient, including a recipient not in a vehicle or a recipient in a vehicle, based upon a distance of the vehicle to a location.

8. The method of claim 6, wherein the at least one grid server comprises a spatial store and a query engine that share information in a common memory.

9. The method of claim 6, further comprising:
computing trajectory-related information for a vehicle and other trajectory-related information for at least one other vehicle using the received sensed data to determine whether two or more vehicles are within a threshold distance of one another; and
responsive to determining that the two or more vehicles are within the threshold distance, outputting the alert-related data for communication to at least one of the two or more vehicles.

10. The method of claim 6, further comprising:
computing trajectory-related information for a vehicle and road-related information corresponding to the individual grid to determine whether the vehicle is in a lane departure state; and
responsive to determining that the vehicle is in the lane departure state, outputting the alert-related data for communication to the vehicle.

11. The method of claim 6, further comprising:
outputting the alert-related data to a plurality of vehicles, in which the plurality of vehicles are determined based upon at least one of: velocity, distance, location estimation error, cloud service latency, or server computing delay.

12. One or more tangible computer storage devices having stored therein instructions, that when executed by a computing device, cause the computing device to perform operations comprising:

receiving, by at least one grid server of a plurality of grid servers, sensed data from mobile devices associated with vehicles, wherein the at least one grid server is associated with at least one grid corresponding to an area; and determining whether the vehicles that are known to the at least one grid server to be in or approaching the associated at least one grid are at risk of collision among other vehicles in the area based on information received from the mobile devices associated with the vehicles;

compensating for inaccuracies in the sensed data by combining the sensed data with at least one of information from one or more other sensors on the mobile devices, information from one or more other vehicles, or historical information associated with the vehicles or the mobile devices;

outputting alert-related data for communication to at least one of the vehicles that is at the risk of collision; and issuing a warning via at least one mobile device to at least one driver associated with the at least one of the vehicles that is at the risk of collision, the warning comprising at least one of an audible alert, a visible alert, or a tactile alert, wherein the at least one mobile device comprises at least one of a smartphone or a built-in vehicle device.

13. The one or more tangible computer storage devices of claim 12, having further computer-executable instructions, comprising:

raising an alert to a recipient, including a recipient not in a vehicle or a recipient in a vehicle, based upon a distance of the vehicle to a location.

14. The one or more tangible computer storage devices of claim 12, wherein the at least one grid server comprises a spatial store and a query engine that share information in a common memory.

15. The one or more tangible computer storage devices of claim 12, having further computer-executable instructions, comprising:

computing trajectory-related information for a vehicle and other trajectory-related information for at least one other vehicle using the received sensed data to determine whether two or more vehicles are within a threshold distance of one another; and responsive to determining that the two or more vehicles are within the threshold distance, outputting the alert-related data for communication to at least one of the two or more vehicles.

16. The one or more tangible computer storage devices of claim 12, having further computer-executable instructions, comprising:

computing trajectory-related information for a vehicle and road-related information corresponding to the individual grid to determine whether the vehicle is in a lane departure state; and responsive to determining that the vehicle is in the lane departure state, outputting the alert-related data for communication to the vehicle.

17. The one or more tangible computer storage devices of claim 12, having further computer-executable instructions, comprising:

outputting the alert-related data to a plurality of vehicles, in which the plurality of vehicles are determined based upon at least one of: velocity, distance, location estimation error, cloud service latency, or server computing delay.

* * * * *